United States Patent
Wilks

(10) Patent No.: US 12,449,334 B2
(45) Date of Patent: Oct. 21, 2025

(54) SAMPLE PREPARATION AND ANALYSIS OF CANNABINOID CONCENTRATION USING SIMPLIFIED LIQUID EXTRACTION

(71) Applicant: ORANGE PHOTONICS, INC., New London, NH (US)

(72) Inventor: Dylan Elmer Wilks, New London, NH (US)

(73) Assignee: ORANGE PHOTONICS, INC., New London, NH (US)

(*) Notice: Subject to any disclaimer, the term of this patent is extended or adjusted under 35 U.S.C. 154(b) by 154 days.

(21) Appl. No.: 17/956,971

(22) Filed: Sep. 30, 2022

(65) Prior Publication Data

US 2023/0036010 A1    Feb. 2, 2023

Related U.S. Application Data

(63) Continuation-in-part of application No. 16/765,631, filed as application No. PCT/US2018/061808 on Nov. 19, 2018, now abandoned.
(Continued)

(51) Int. Cl.
*G01N 33/00* (2006.01)
*G01N 1/28* (2006.01)
(Continued)

(52) U.S. Cl.
CPC ............... *G01N 1/286* (2013.01); *G01N 1/34* (2013.01); *G01N 21/3577* (2013.01); *G01N 30/06* (2013.01); *G01N 30/34* (2013.01); *G01N 33/0098* (2013.01); *G01N 2001/2866* (2013.01); *G01N 2030/062* (2013.01)

(58) Field of Classification Search
CPC ........ G01N 1/4055; G01N 5/00; G01N 30/16; G01N 30/74; G01N 33/0098; G01N 2001/2866; G01N 2001/4061; G01N 2030/027; G01N 2030/062; G01N 1/34;
(Continued)

(56) References Cited

U.S. PATENT DOCUMENTS 6,860,998 B1    3/2005    Wilde
10,466,216 B2    11/2019    Wilks
(Continued)

FOREIGN PATENT DOCUMENTS

CN    104277917 A       1/2015
CN    104398580    *    2/2015
(Continued)

OTHER PUBLICATIONS

Hamilton College, Weighing Samples for EA IRMS Analysis, 2016, 9 pages.
(Continued)

*Primary Examiner* — Robert R Raevis
(74) *Attorney, Agent, or Firm* — Morgan, Lewis & Bockius LLP

(57) ABSTRACT

Various approaches preparing *Cannabis* flower samples for analysis of cannabinoid content, the method comprising the steps of weighing the sample in a portable or benchtop balance; adding, to a container, the weighed sample and a solvent; agitating the vial and thereafter extracting a liquid component therefrom; and analytically analyzing the sample using the solvent based on the weight and a volume of the extracted liquid.

24 Claims, 4 Drawing Sheets

Related U.S. Application Data

(60) Provisional application No. 62/588,504, filed on Nov. 20, 2017, provisional application No. 62/588,507, filed on Nov. 20, 2017.

(51) Int. Cl.
  *G01N 1/34* (2006.01)
  *G01N 21/3577* (2014.01)
  *G01N 30/06* (2006.01)
  *G01N 30/34* (2006.01)

(58) Field of Classification Search
  CPC .............. G01N 21/3577; G01N 30/34; G01N 33/0093; C07D 311/80
  USPC ... 73/1.01, 1.03, 61.41, 61.52, 61.57, 61.59, 73/64.56, 863, 863.21, 863.11, 863.23, 73/866; 422/70; 210/656, 198.2; 250/339.07, 339.08; 356/36
  See application file for complete search history.

(56) References Cited

U.S. PATENT DOCUMENTS

| | | |
|---|---|---|
| 2006/0167283 A1 | 7/2006 | Flockhart et al. |
| 2015/0252285 A1 | 9/2015 | Donohue et al. |
| 2017/0059536 A1 | 3/2017 | Wilks |
| 2019/0010110 A1* | 1/2019 | Oroskar ................. C07C 51/42 |
| 2019/0360903 A1 | 11/2019 | Wilks |
| 2020/0131097 A1* | 4/2020 | Gordon ................. A01G 31/00 |
| 2020/0278279 A1 | 9/2020 | Wilks |
| 2021/0151131 A1 | 5/2021 | Wilks |

FOREIGN PATENT DOCUMENTS

| | | | |
|---|---|---|---|
| CN | 104398580 A | | 3/2015 |
| CN | 110780003 | * | 2/2020 |
| CN | 112730679 | * | 4/2021 |
| ES | 2337460 T3 | | 4/2010 |

OTHER PUBLICATIONS

International Search Report and Written Opinion issued in corresponding International Patent Application No. PCT/LIS2018/061808, dated Feb. 7, 2019, 10 pages.

Seely, "Balances and Their Use in the Chemistry Laboratory", 2017, 7 pages.

* cited by examiner

SAMPLE PREPARATION AND ANALYSIS OF CANNABINOID CONCENTRATION USING SIMPLIFIED LIQUID EXTRACTION

CROSS-REFERENCE TO RELATED APPLICATIONS

This is a continuation-in-part of U.S. Ser. No. 16/765,631, filed on May 20, 2020, which is the national stage of PCT Appl. No. PCT/US2018/061808, which claims priority to U.S. Provisional Application Nos. 62/588,504 and 62/588,507, both filed on Nov. 20, 2017. The entireties of these priority documents are hereby incorporated by reference.

FIELD OF THE INVENTION

The field of the invention relates, generally, to the preparation of *Cannabis* flower samples and concentrate samples and, more particularly, to a preparation that uses simplified liquid extraction prior to analytical analysis of cannabinoid concentration.

BACKGROUND

*Cannabis* flower is a complex botanical sample with over 400 chemical entities present. One class of chemicals, cannabinoids, is of particular interest in *Cannabis* flower. This is due to the psychoactive and therapeutic effect of some of the cannabinoids. For example, delta-9-tetrahydrocannabinol (D9THC) is a known psychoactive chemical that is often found at high concentrations in the *Cannabis* plant. Cannabidiol is known for its therapeutic effects, for example, in reducing the symptoms of epilepsy. These and other cannabinoids are currently being explored for additional therapeutic effects. It is therefore important to develop techniques to analyze *Cannabis* concentrates for cannabinoid content.

*Cannabis* plant material is often extracted into essential oils in order to further concentrate the product and facilitate dosing *Cannabis* into other products. There are several processes that are used to extract *Cannabis*. Most involve using an appropriate solvent—such as butane, ethanol or supercritical carbon dioxide—to extract essential oils. The wide array of final products produced through extraction provide a challenging matrix for chemical analysis.

Chemical analysis of components by, for example, liquid chromatography or infrared spectroscopy often benefits from or requires sample preparation prior to analysis. It is important to prepare a sample for chemical analysis in a method that facilitates accurate and repeatable results. In the case of botanical samples, the chemical matrix is often complex with hundreds or thousands of components in a typical matrix. Sample preparation for these complex matrices is often critical to analytical analysis success.

Several sample preparation techniques involve liquid extraction, which involves removing some components in the sample matrix by dissolving them in an appropriate solvent or solvent matrix; see, e.g., ASTM D7066. Liquid extraction provides at least two benefits as an analytical sample preparation method. First, it can separate out any non-extractable components that might interfere with the desired analysis, and second, a liquid medium is typically easier to handle and can provide a homogeneous sample.

Liquid extraction can pose challenges, however. Solvents may be toxic, volatile or dangerous to work with. A liquid extraction may require several complex and time-consuming steps. And extraction techniques may require dedicated and expensive equipment. These limitations often relegate liquid extraction sample preparation to a laboratory environment.

Common methods for preparing *Cannabis* flower liquid extract typically involve the following steps:
1. Dry the sample over a 24-hour period using a forced ventilation oven.
2. Grind the sample into a fine powder with a mortar and pestle and/or mechanical grinding apparatus.
3. Weigh a small amount of sample (e.g., 10-500 milligrams) and add it to a glass vial.
4. Add some amount (e.g., 10-100 milliliters) of a chloroform and methanol extraction solvent mixture to the vial.
5. Sonicate the sample and solvent for 30 minutes.
6. Filter the sample and dilute the filtered sample by a factor of 1:10 or similar.
7. Evaporate a small aliquot (e.g., 100 microliters) of the sample under dry nitrogen.
8. Re-dissolve the sample in a small amount (e.g., 100 microliters) of an acetonitrile and water solvent mixture.

Similarly, common methods for preparing *Cannabis* concentrate typically involve the following steps:
1. Grate the sample into small particles under liquid nitrogen.
2. Weigh a small amount of sample (e.g., 50 milligrams or similar) and add it to a glass vial.
3. Add some amount (e.g., 10-100 milliliters) of a chloroform and methanol extraction solvent mixture to the vial.
4. Sonicate the sample and solvent for 30 minutes.
5. Filter the sample and dilute the filtered sample by a factor of 1:10 or similar.
6. Evaporate a small aliquot (e.g., 100 microliters) of the sample under dry nitrogen.
7. Evaporate a small aliquot (e.g., 100 microliters) under dry nitrogen.
8. Re-dissolve the sample in a small amount (e.g., 100 microliters) of an acetonitrile and water solvent mixture.

In order to perform the above steps for preparing the *Cannabis* concentrate and *Cannabis* flower liquid extraction in a repeatable and accurate manner, specialized skills and chemistry equipment are typically required. In addition, toxic chemicals, such as chloroform and acetonitrile, may require safety protocols and equipment.

Accordingly, there is a need for improved methods for liquid extraction of the *Cannabis* flower and *Cannabis* concentrate to be performed in situations where the analysis takes place out of the laboratory or by a person not experienced in the art of liquid extraction, and/or when the sample analysis must be completed quickly.

SUMMARY

Embodiments of the present invention provide simplified approaches for preparing *Cannabis* flower samples and *Cannabis* concentrate samples for analysis of cannabinoid content in a non-laboratory environment. The approaches described herein advantageously allow the sample preparation time to be shorter than that required by conventional approaches. In addition, because the equipment used herein can be obtained and utilized in a non-laboratory environment, responsible personnel do not require any specialized skills.

One exemplary approach for preparing *Cannabis* flower samples includes determining a target weight of the sample and weighing the sample in the extraction vial, in the cap of the extraction vial, or in any other component (e.g., a small weighing boat) that is re-introduced into (and remains inside) the sample vial during the rest of the extraction. That is, the weight of the extraction vial, cap, or weighing boat is known, so the sample weight can be determined by taring. If the weight of the sample exceeds the target weight, the excess may be removed. In the case of a weighing boat, after the weight of the sample-containing boat is obtained and any excess sample removed, the boat is placed in the sample vial and the procedure continues.

In addition, the solvent used for extraction may be the same solvent required for the analysis performed after the extraction. For example, the solvent may include or consist essentially of the solvent matrix used in the mobile phase of the chromatography equipment (e.g., methanol with 5-30% buffered water or another polar solvent or acetonitrile with 5-30% buffered water or another polar solvent). Alternatively, the solvent may be selected so as not to absorb significant electromagnetic radiation at one or more important wavelengths for cannabinoid analysis, e.g., 210-350 nm, 3000 nm, 5000 nm, 5700 nm, 6250 nm and 8000 nm. The solvent may be, for example, one or more of hexane, heptane, octane and carbon tetrachloride, acetone or acetonitrile, and may be delivered to the vial via a disposable syringe or other suitable means. The sample may then be agitated using a small electromechanical shaker as opposed to typical sonication and/or laboratory shakers and stirrers. If a syringe is used to deliver extraction solvent to the vial, it may also be used to remove the sample after extraction. In some embodiments, the sample is not filtered prior to injection into an analytical instrument. The filtering may be achieved using, for example, a filter attached to or integrated with the syringe.

For example, the solvent may include or consist essentially of the solvent matrix used in the mobile phase of the chromatography equipment (e.g., methanol with 5-30% buffered water or another polar solvent or acetonitrile with 5-30% buffered water or another polar solvent). Alternatively, the solvent may be selected so as not to absorb significant electromagnetic radiation at one or more important wavelengths for cannabinoid analysis, e.g., 210-350 nm, 3000 nm, 5000 nm, 5700 nm, 6250 nm and 8000 nm. The solvent may be, for example, hexane, heptane, octane and carbon tetrachloride, acetone or acetonitrile, and may be delivered to the vial via a disposable syringe or other suitable means. In various embodiments, the sample is then heated using a steam generator (as opposed to a water bath or other laboratory equipment). Subsequently, the sample may then be agitated using a small electromechanical shaker as opposed to typical sonication and/or laboratory shakers and stirrers. Again, if a syringe is used to deliver extraction solvent to the vial, it may also be used to remove the sample after extraction. In some embodiments, the sample is not filtered until the moment of injection into an analytical instrument. The filtering may be achieved using, for example, a filter attached to the syringe.

For concentrate analysis on samples that contain a significant lipid component (e.g., raw Cannabis oil, which contains substantial amounts of plant fat, and therefore is thick and sticky), highly concentrated (≥90% by weight or volume) methanol with only a small amount (≤10% by weight or volume) buffer so that the sample can be attacked and dissolved. Then, solvent with much less methanol and more buffer (typically 25-50% methanol and 50-75% aqueous buffer, by weight or volume) can be added post-extraction, and when added in the correct ratio matches the ratio of methanol/buffer in the solvent to that used in the chromatograph. This has two advantages: First, it makes it possible to use a stronger solvent to dissolve a sample and then still inject it into a chromatograph, which generally needs less solvent strength (more aqueous/buffer) to work as expected. Second, adding the extra buffer/aqueous solution to the original extraction solvent causes longer-chain plant lipids to precipitate out since they are no longer compatible with the solvent. Filtering during injection excludes those fats, thereby extending the life of the column by avoiding the damage that could be caused if longer-chain lipids coat it.

Accordingly, in one aspect, the invention pertains to a method of preparing a *Cannabis* flower sample for analysis of cannabinoid content. In various embodiments, the method includes the steps of manually grinding the *Cannabis* flower sample; weighing the sample in a portable or benchtop balance; adding, to a container, the weighed sample and a solvent; agitating the vial and thereafter extracting a liquid component therefrom; and analytically analyzing the sample using the solvent based on the weight and a volume of the extracted liquid. In one implementation, the sample is weighed in the container. For example, the sample may be weighed in a component within the container. In addition, a disposable syringe may be used to deliver the solvent to the container and to extract the liquid component therefrom. As used herein, the terms "weight" and "mass" are used interchangeably (so that, for example, the term "weight percent" also connotes "mass percent" and vice versa).

In one embodiment, the analytic analysis is an infrared spectroscopy analysis; the solvent does not absorb significant electromagnetic radiation at one or more of 3000 nm, 5000 nm, 5700 nm, 6250 nm and 8000 nm. The solvent may include or consist essentially of one or more of hexane, heptane, octane and carbon tetrachloride, acetone or acetonitrile. In another embodiment, the analytic analysis is a liquid chromatographic analysis; the solvent may include or consist essentially of methanol with 5-30% buffered water (or another polar solvent) or acetonitrile with 5-30% buffered water (or another polar solvent). In some embodiments, the solvent includes no chloroform. In addition, the method may further include determining a target weight of the sample. The method may further include removing at least a portion of the weighed sample based on the determined target weight. In one implementation, the method further includes computing a weight percent of the extracted liquid based on the weight of the sample and a volume of the solvent.

In another aspect, the invention relates to a method of preparing a *Cannabis* concentrate sample for analysis of cannabinoid content. In various embodiments, the method includes the steps of weighing the sample in a portable or benchtop balance; adding, to a container, the weighed sample and a solvent; heating the *Cannabis* sample; agitating the vial and thereafter extracting a liquid component therefrom; and analytically analyzing the sample using the solvent based on the weight and a volume of the extracted liquid. In one implementation, the sample is weighed in the container. For example, the sample may be weighed in a component within the container. In addition, a disposable syringe may be used to deliver the solvent to the container and to extract the liquid component therefrom.

In one embodiment, the analytic analysis is an infrared spectroscopy analysis; the solvent does not absorb significant electromagnetic radiation at one or more of 3000 nm, 5000 nm, 5700 nm, 6250 nm and 8000 nm. The solvent may include or consist essentially of one or more of hexane, heptane, octane and carbon tetrachloride, acetone or acetonitrile. In another embodiment, the analytic analysis is a liquid chromatographic analysis; the solvent may include or consist essentially of methanol with 5-30% buffered water (or another polar solvent) or acetonitrile with 5-30% buffered water (or another polar solvent). In some embodiments, the solvent includes no chloroform. In addition, the sample may be heated in a portable steam generator. The method may further include determining a target weight of the sample. In addition, the method may further include removing at least a portion of the weighed sample based on the determined target weight. In one implementation, the method further includes computing a weight percent of the extracted liquid based on the weight of the sample and a volume of the solvent.

Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The term "consists essentially of" means excluding other materials that contribute to function, unless otherwise defined herein. Nonetheless, such other materials may be present, collectively or individually, in trace amounts. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DETAILED DESCRIPTION

In accordance with embodiments of the present invention, extraction of Cannabis flower liquid is improved with a simplified process that takes a relatively short time (e.g., less than five minutes) and uses less-toxic solvents than conventional approaches. In addition, the improved sample preparation approaches described herein may allow the sample to be prepared in a way that can be presented to analytical instrumentation without further dilution. In one embodiment, the solvent used for Cannabis flower liquid extraction can be selected for compatibility with the subsequent analytical procedure (e.g., liquid chromatography or infrared spectroscopic analysis). Further, embodiments of the present invention may effectively remove much of the preparation complexity while still providing an acceptable level of extraction efficiency and repeatability.

Figure 1A:
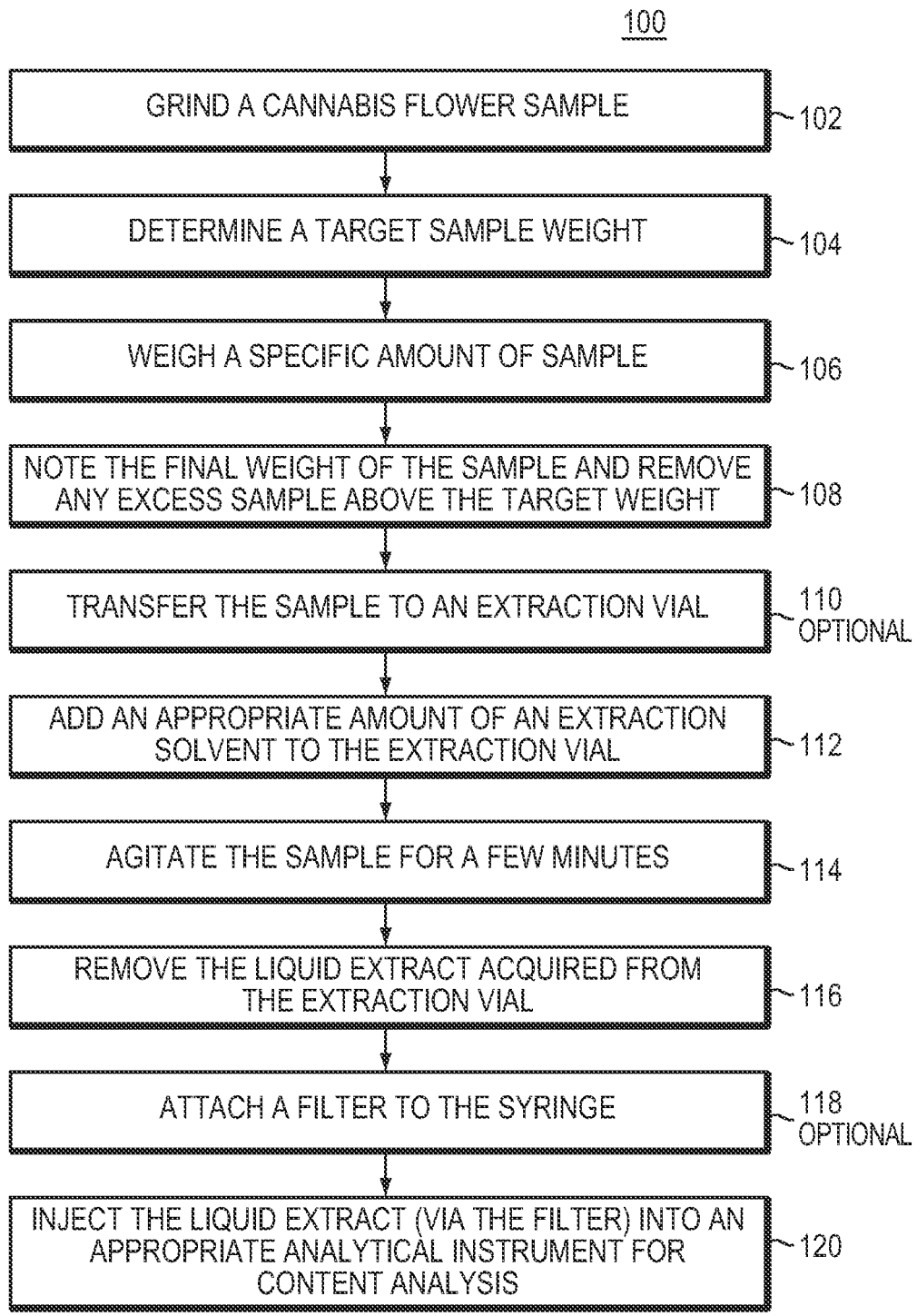
FIG. 1A is a flow chart of an exemplary approach for preparing Cannabis flower liquid extraction in accordance with various embodiments of the present invention.

FIG. 1A is a flow chart of an exemplary approach 100 for preparing Cannabis flower liquid extraction in accordance herewith. In a first step 102, the Cannabis flower sample is ground manually, e.g., using an herbal grinder that is used to prepare botanical samples. In a second step 104, a target sample weight is determined based on, for example, a portable balance's ability to accurately weigh (e.g., the accuracy of the balance relative to sample weight). The portable balance allows measurements to be performed in a non-laboratory environment without a significant degradation of accuracy. Typically, the target weight is larger than (e.g., by 5%, 10%, or 20%) the minimal capacity of the portable balance. In a third step 106, a specific amount of sample (typically ≥100 mg) is weighed using, for example, the portable balance in the non-laboratory environment. The sample may be weighed in a sample vial used for analysis later, in the cap of the same sample vial, or in a small weighing boat that can be placed inside the extraction vial. This may advantageously avoid any loss of Cannabis trichomes or other material that may affect subsequent analysis. In a fourth step 108, the final weight of the sample is noted; in addition, any excess sample above the target weight may be removed.

In a fifth step 110, the sample may be transferred to a disposable extraction vial (typically 10-50 mL in size). If the sample is weighed in the vial as described above, step 110 may be optionally skipped. In a sixth step 112, an appropriate amount (e.g., 10 mL) of an extraction solvent may be added to the extraction vial using, for example, a readily available disposable syringe. The extraction solvent may be selected based on the subsequent analytical procedure. For example, if the sample is prepared for a chromatographic analysis, the solvent may be the same solvent mixture as the mobile phase of the chromatography system. As a result, only one solvent or solvent mixture is required for sample preparation and analysis. In one embodiment, the chromatography solvent mixture (and the extraction solvent mixture) includes or consists essentially of methanol with 5-30% buffered water. In another embodiment, the chromatography solvent mixture (and the extraction solvent mixture) includes or consists essentially of acetonitrile with 5-30% buffered water. In other embodiments, the sample is prepared for an infrared (IR) spectroscopy analysis. Thus, the solvent is selected to provide low absorbance at one or more important infrared wavelengths for spectroscopy analysis of Cannabis potency. The important wavelengths may include electromagnetic radiation having a wavelength of 210-350 nm (ultraviolet), or 3000 nm, 5000 nm, 5700 nm, 6250 nm, 6900 nm, and 8000 nm, etc. (infrared). In one embodiment, the solvent includes or consists essentially of one or more of hexane, heptane, octane and carbon tetrachloride, acetone or acetonitrile, among others.

Figure 1B:
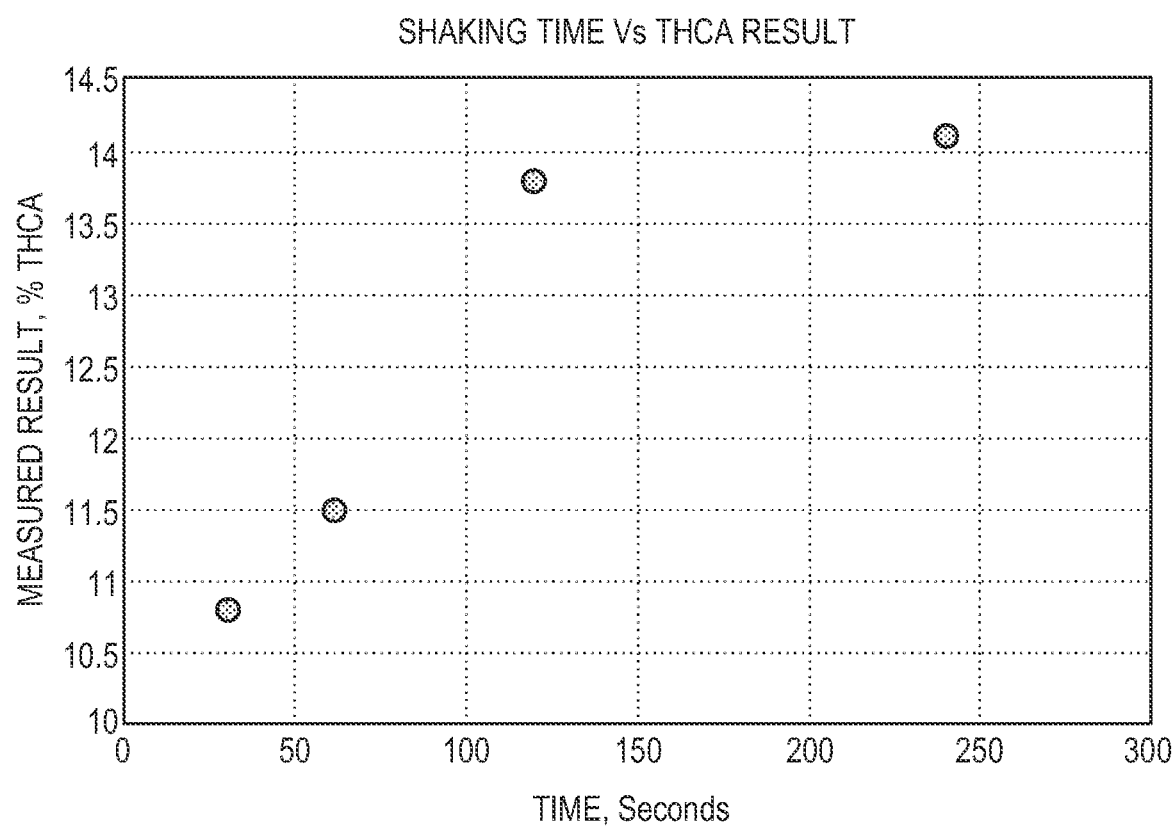
FIG. 1B illustrates a relationship between an extraction efficiency of Tetrahydrocannabinolic Acid (THCA) and an agitating time in accordance with various embodiments of the present invention.

In a seventh step 114, the sample may be agitated for a few minutes (e.g., two minutes) using, for example, a small motorized shaking device (which may be, for example, a nail polish or hobby paint shaker). In one embodiment, the shaking time is empirically determined based on previous sample preparations such that it can provide adequate repeatability and extraction efficiency. For example, FIG. 1B depicts an empirical relationship between an extraction efficiency of THCA and the shaking time. As shown, after shaking the sample for 120 seconds, more than 98% of the THCA may be extracted. Accordingly, in one embodiment, the sample is agitated for two minutes. The small motorized shaking device used herein may advantageously allow the sample preparation to be performed by inexperienced personnel in the non-laboratory environment; by contrast, personnel having specialized skills may be required to perform extraction agitation using a laboratory shaker (e.g., a sonication device, a large electrical shaker or a stir plate).

In an eighth step 116, the liquid extract acquired in step 114 may now be removed from the extraction vial by the same or similar disposable syringe used in step 112. Use of the same syringe may advantageously reduce the amount of equipment required for the sample preparation. In an optional step 118, a syringe filter may be attached to or integrated with the syringe. Subsequently, the liquid extract in the syringe may be injected, via the filter, into an appropriate analytical instrument such that any particulates in the liquid extract may be removed prior to entering the analytical instrument (in step 120). Because the liquid extract has a known weight (per step 106) and a known extraction volume (per step 112), the analysis may use this information to calculate the weight percent of the analyte of interest using a mathematical protocol executed by the analytical instrument or by the user.

Accordingly, various embodiments of the invention provide simplified approaches for preparing Cannabis flower samples for analysis of cannabinoid content in a non-laboratory environment; the approaches may include manually grinding the sample of interest using, for example, a common herbal grinder; weighing the sample in a portable or benchtop balance; optionally transferring the weighed sample to a vial; adding no (or at least a limited amount of) toxic solvent (e.g., chloroform) to the vial; agitating the sample for a short duration (e.g., two minutes) using, for example, an electromechanical shaker; removing the sample from the vial; and filtering the sample prior to analysis (e.g., chromatographic analysis or IR spectroscopy analysis).

In addition, various embodiments of the present invention as further described below provide improved approaches for preparing Cannabis concentrate liquid extraction for analysis. The improved sample preparation approaches utilize a simplified process that takes less time (e.g., five minutes) than that required in conventional approaches, and use less-toxic solvents than conventional approaches for Cannabis sample preparation. In addition, the improved approaches for Cannabis concentrate liquid extraction described herein may allow the sample to be prepared for presentation to analytical instrumentation without further dilution. Further, embodiments of the present invention may effectively remove much of the complexity in Cannabis concentrate preparation while still providing an acceptable level of liquid extraction efficiency and repeatability.

Figure 2:
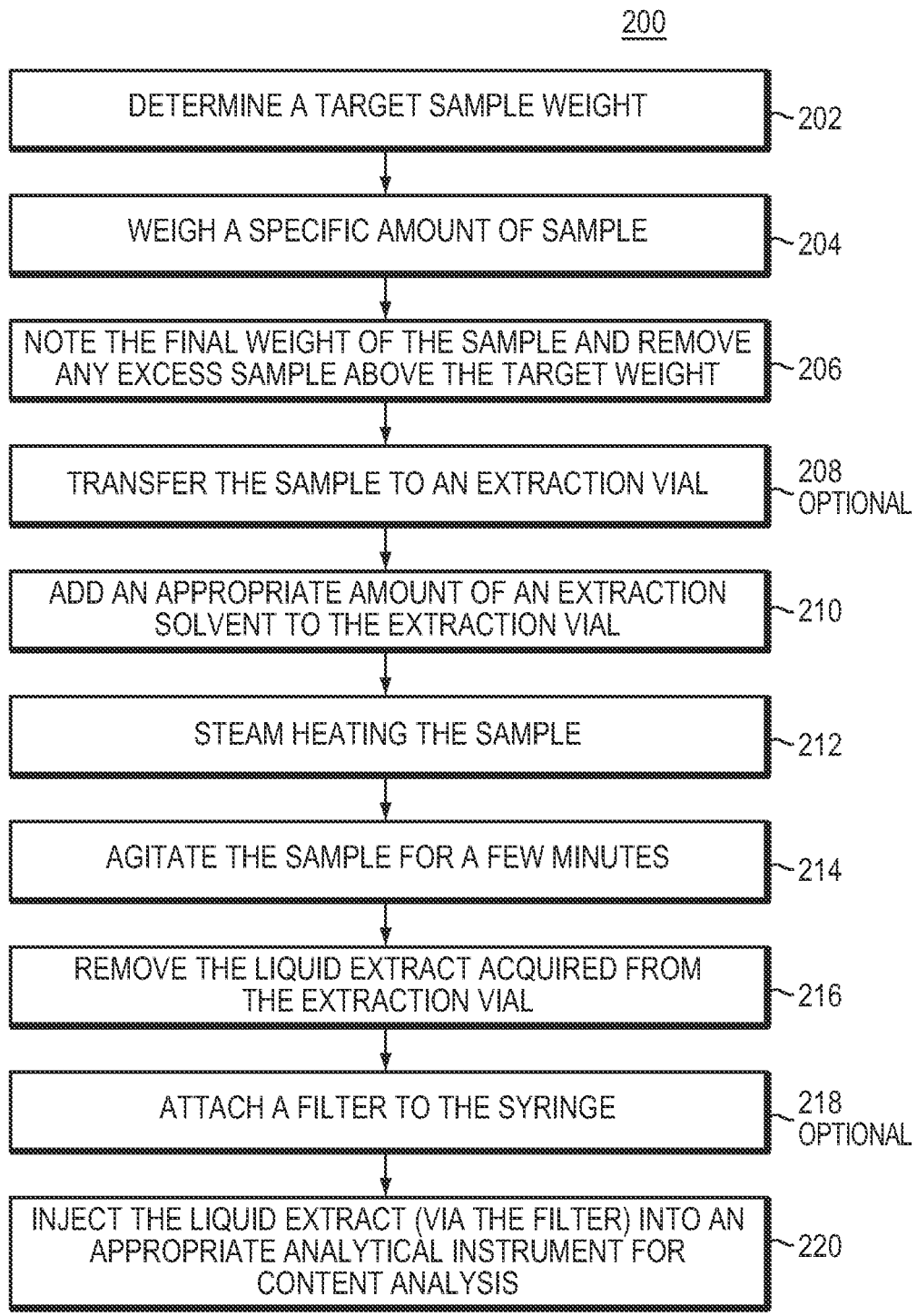
FIG. 2 is a flow chart of an exemplary approach for preparing Cannabis concentrate liquid extraction in accordance with various embodiments of the present invention.

FIG. 2 is a flow chart of an exemplary approach 200 for preparing Cannabis concentrate liquid extraction in accordance herewith. In a first step 202, a target sample weight is determined based on, for example, a portable balance's ability to accurately weigh (e.g., the accuracy of the balance relative to sample weight). The portable balance allows measurements to be performed in a non-laboratory environment without a significant degradation of accuracy. Typically, the target weight is larger than (e.g., by 5%, 10%, or 20%) the minimal capacity of the portable balance.

In a second step 204, a specific amount of sample (typically ≥100 mg) is weighed using, for example, the portable balance in the non-laboratory environment. The sample may be weighed in a sample vial used for analysis later, in the cap of the same sample vial, or in a small weighing boat that can be placed inside the extraction vial. This may avoid any loss of Cannabis trichomes or other material that may affect subsequent analysis. Accordingly, this approach is particularly advantageous over conventional approaches where loss of material is common in weighing Cannabis concentrates due to the stickiness of Cannabis concentrates at room temperatures. In a third step 206, the final weight of the sample is noted; in addition, any excess sample above the target weight may be removed.

In a fourth step 208, the sample may be transferred to a disposable extraction vial (typically 10-50 mL in size). If the sample is weighed in the vial as described above, step 208 may be optionally skipped. In a fifth step 210, an appropriate amount (e.g., 10-30 mL) of an extraction solvent may be added to the extraction vial using, for example, a readily available disposable syringe. Again, the extraction solvent may be selected based on the subsequent analytical procedure. For example, if the sample is prepared for a chromatographic analysis, the solvent may be selected to be the same solvent mixture as the mobile phase of the chromatography system. As a result, only one solvent or solvent mixture is required for the sample preparation and sample analysis. In one embodiment, the chromatography solvent mixture (and thereby the extraction solvent mixture) includes or consists essentially of methanol with 5-30% buffered water. In another embodiment, the chromatography solvent mixture (and thereby the extraction solvent mixture) includes or consists essentially of acetonitrile with 5-30% buffered water. In other embodiments, the sample is prepared for an infrared (IR) spectroscopy analysis. Thus, the solvent is selected to provide low absorbance at one or more important infrared wavelengths for IR analysis of Cannabis potency. The important wavelengths may include electromagnetic radiation having a wavelength of 210-350 nm, 3000 nm, 5000 nm, 5700 nm, 6250 nm, 6900 nm, and 8000 nm, etc. In one embodiment, the solvent includes or consists essentially of one or more of hexane, heptane, octane and carbon tetrachloride, acetone or acetonitrile, among others.

Figure 3:
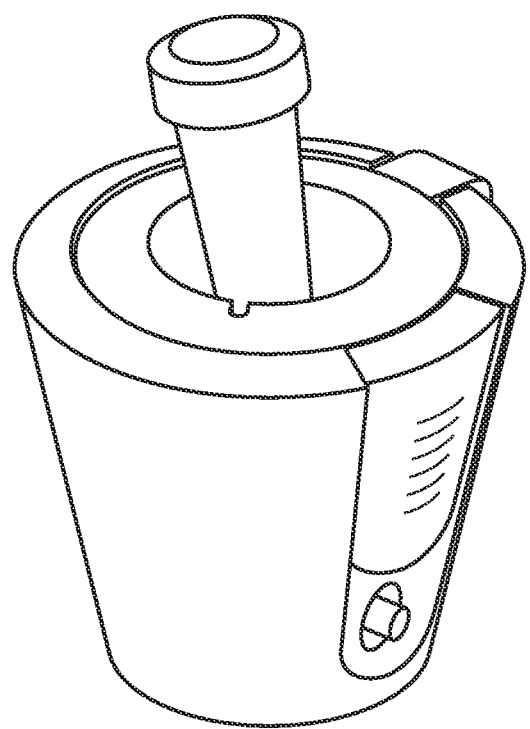
FIG. 3 depicts an exemplary steam generator for preparing Cannabis concentrate in accordance with various embodiments of the present invention.
Figure 4:
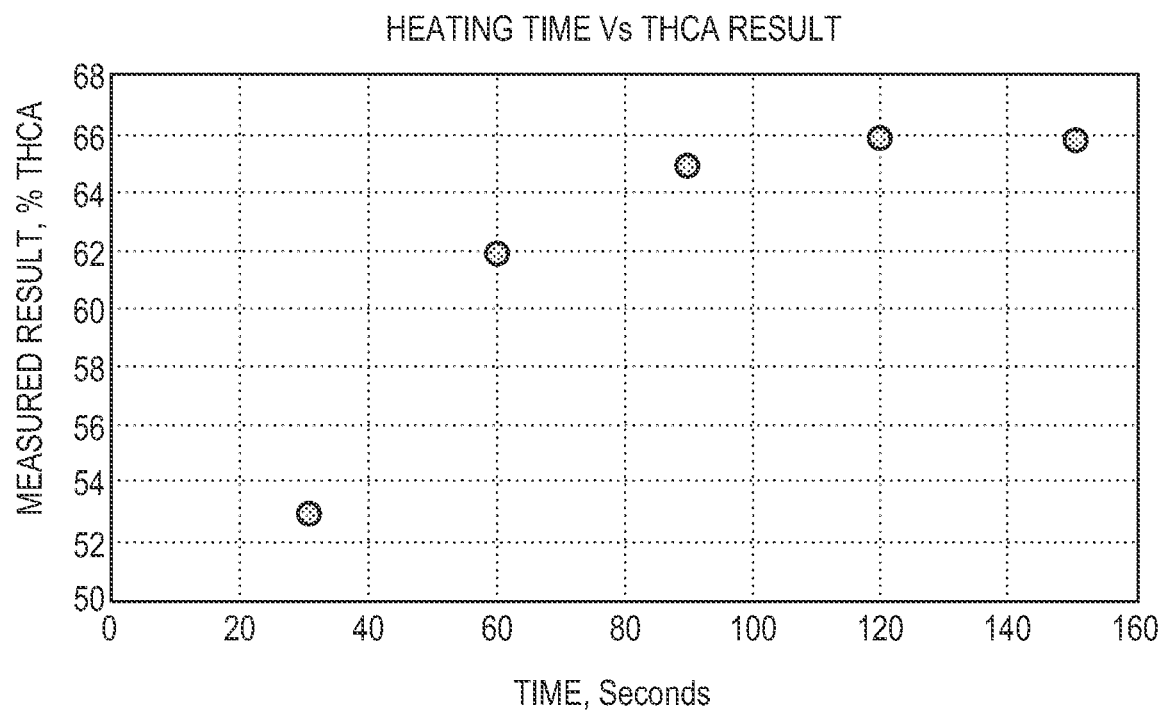
FIG. 4 illustrates a relationship between an extraction efficiency of Tetrahydrocannabinolic Acid (THCA) and a heating time in accordance with various embodiments of the present invention.

In a sixth step 212, the sample is placed in a steam generator. Using steam to heat the sample is significantly faster than common methods using a heated water bath, and requires only a few ounces (e.g., 5-40 mL) of water. In one embodiment, the steam generator is portable. FIG. 3 depicts an exemplary portable steam generator in accordance with various embodiments. In addition, the heating time of the sample may be empirically determined based on previous sample preparations. For example, FIG. 4 depicts an empirical relationship between an extraction efficiency of THCA and the heating time. As shown, after steam-heating the sample for 120 seconds, more than 98% of the THCA may be extracted. Accordingly, in one embodiment, the sample is steam-heated for two minutes.

Referring again to FIG. 2, the sample may then be agitated for a few minutes (e.g., two minutes) using, for example, a small motorized shaking device (which may be, for example, a nail polish or hobby paint shaker) (in a seventh step 214). In one embodiment, the shaking time is empirically determined based on previous sample preparations such that it can provide adequate repeatability and extraction efficiency. For example, as depicted in FIG. 1B, after shaking the sample for 120 seconds, more than 98% of the THCA may be extracted. Accordingly, in one embodiment, the sample is agitated for two minutes. The small motorized shaking device used herein may advantageously allow the sample preparation to be performed by inexperienced personnel in the non-laboratory environment; by contrast, personnel having specialized skills may be required to perform extraction agitation using a laboratory shaker (e.g., a sonication device, a large electrical shaker or a stir plate).

Referring again to FIG. 2, in an eighth step 216, the liquid extract acquired in step 214 may now be removed from the extraction vial by the same or similar disposable syringe used in step 210. Again, use of the same syringe may advantageously reduce the amount of equipment required for the sample preparation. In an optional step 218, a syringe filter may be attached to or integrated with the syringe. Subsequently, the liquid extract in the syringe may be injected, via the filter, into an appropriate analytical instrument such that any particulates in the liquid extract may be removed prior to entering the analytical instrument (per step 220). Because the liquid extract has a known weight (per step 204) and a known extraction volume (as the amount of the extraction solvent added in step 210), the analysis may use this information to calculate the weight percent of the analyte of interest.

EXAMPLE

An exemplary protocol for analyzing a sample as described above is as follows. First, a known weight of solid sample is dissolved into an appropriate solvent. It is assumed for simplicity that the target analyte is fully extracted into the target solvent, resulting in a mass/volume percent of the target analyte. This mass/volume percentage can be calculated as follows:

$$\% \frac{\text{Mass}}{\text{Volume}}\left(\frac{g}{ml}\right) = \frac{M_{solute}(g)}{V_{solvent}(ml)} \times 100 \qquad \text{Eq. 1}$$

In Equation 1, $M_{solute}$ is the mass of the solid sample and $V_{solvent}$ is the volume of the solution in which the target mass is dissolved. In the case of *Cannabis* analysis, the objective is to quantify the mass percent of the target analytes, which are cannabinoids, in a *Cannabis*-containing product. In this case, a selected mass is added to an appropriate solvent and extracted such that all of the target analyte is dissolved in the solution. The target analyte makes up an unknown mass percentage of the total mass added to the solvent. This means there is an unknown amount of target analyte mass that is dissolved in a known amount of solvent.

Next, standards are purchased or prepared that have a known mass/volume ratio so that the unknown can be compared using proportional analysis. Both the standard and the unknown are injected onto an instrument with a fixed volume, in this case a liquid chromatograph. The resulting signal corresponds to the concentration in both the standard and the unknown sample. The signal used is commonly the peak height or peak area response to the introduction of a sample. The equation for proportional analysis is as follows:

$$\frac{C_{standard}}{S_{standard}} = \frac{C_{unknown}}{S_{unknown}} \qquad \text{Eq. 2}$$

In Equation 2, $C_{standard}$ is the standard concentration (mass/volume), $S_{standard}$ is the instrument signal response for that standard, $C_{unknown}$ is the unknown concentration the target analyte and $S_{unknown}$ is the instrument signal response for that standard. In other words, the signal level of the standard is used to determine the concentration of the unknown. For this exemplary case, a linear correlation between the signal of the instrument and the concentration of a sample is assumed. In some cases, multiple standard concentrations are injected into an instrument and an equation is generated to correlate the signal with the unknown concentration.

The equation can be re-written to solve for the unknown concentration:

$$C_{unknown} = \frac{S_{unknown} \times C_{standard}}{S_{standard}} \qquad \text{Eq. 3}$$

Now the mass/volume percent of the unknown sample can be determined. The volume of the solvent added during extraction is also known so the mass of the original extracted sample can be determined by combining the Equations 1 and 3:

$$M_{target} = C_{unknown} \times V_{solvent} \qquad \text{Eq. 4}$$

where $M_{target}$ is the mass of the target analyte. Both the mass/volume concentration and the original volume are known. Since the total mass of the original material prior to extraction is also known, the mass percent or weight percent of the original sample may be computed as:

$$\text{Mass Percent} = \frac{M_{target}}{M_{total}} \times 100 \qquad \text{Eq. 5}$$

where Mass Percent is the desired concentration of the *Cannabis*-containing product, $M_{target}$ is the calculated mass of the target analyte, and $M_{total}$ is the total mass of the *Cannabis*-containing product placed into the solvent.

In a representative sequence, 100 mg of unknown sample is extracted into 10 mL of solvent. A calibration standard containing 1 mg of standard per mL of solvent is employed. For purposes of this example, the signal from the instrument is 1 with the calibration standard and 0.5 for the unknown standard, such that $C_{standard}$=1 mg/mL $S_{standard}$=1 AU (absorbance units, a typical signal level from a chromatography system)

$S_{unknown}$=0.5 AU

Per Equation 3:

$C_{unknown}$=(0.5×1)/1=0.5 mg/mL

The concentration of the target analyte in this case is 0.5 mg/mL. Since the original sample was extracted in 10 mL solvent, Eq. 4 can be used to determine the target analyte mass:

$M_{target}$=0.5×10=5 mg

Finally, the mass percent can be calculated since the original mass added during extraction was 100 mg. Using Equation 5:

Mass Percent=5/100×100=5%

Accordingly, various embodiments of the invention provide simplified approaches for preparing *Cannabis* concentrate samples for analysis of cannabinoid content in a non-laboratory environment; the approaches may include weighing the sample in a portable or benchtop balance; optionally transferring the weighed sample to a vial; adding no (or at least a limited amount of) toxic solvent (e.g., chloroform) to the vial; using steam to heat the *Cannabis* sample; agitating the sample for a short duration (e.g., two minutes) using, for example, an electromechanical shaker; removing the sample from the vial; and filtering the sample prior to analysis (e.g., chromatographic analysis or IR spectroscopy analysis).

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A method of preparing a *Cannabis* flower sample for analyzing of cannabinoid content, the method comprising the steps of:
   a. manually grinding the *Cannabis* flower sample;
   b. weighing the sample in a portable or benchtop balance;
   c. adding a solvent to the weighed sample;
   d. agitating the weighed sample and solvent and thereafter extracting a liquid component therefrom; and
   e. analyzing the sample using the solvent based on the weight and a volume of the extracted liquid, including determining a cannabinoid weight percent in the sample.

2. The method of claim 1, wherein the sample is weighed in a container.

3. The method of claim 2, wherein the sample is weighed in a weighing boat within the container.

4. The method of claim 1, wherein the analytic analysis is an infrared spectroscopy analysis, and the solvent does not absorb significant electromagnetic radiation at one or more of 3000 nm, 5000 nm, 5700 nm, 6250 nm and 8000 nm.

5. The method of claim 4, wherein the solvent is hexane, heptane, a mixture of octane and carbon tetrachloride, acetone, or acetonitrile.

6. The method of claim 1, wherein analytic analysis is a liquid chromatographic analysis, and the solvent comprises methanol with 5-30% buffered water or another polar solvent or acetonitrile with 5-30% buffered water or another polar solvent.

7. The method of claim 1, wherein a disposable syringe is used to deliver the solvent to the container and to extract the liquid component therefrom.

8. The method of claim 1, wherein the solvent comprises no chloroform.

9. The method of claim 1, further comprising determining a target weight of the sample.

10. The method of claim 9, further comprising removing at least a portion of the weighed sample in excess of the determined target weight.

11. The method of claim 1, wherein the sample contains a lipid component and the solvent for the extracting step and for analyzing step comprises methanol and a buffer, a concentration of methanol in the solvent used in the extracting step exceeding a concentration of methanol in the solvent used in the analyzing step.

12. A method of preparing a *Cannabis* concentrate sample for analyzing of cannabinoid content, the method comprising the steps of:
    a. weighing the sample in a portable or benchtop balance;
    b. adding a solvent to the weighed sample;
    c. heating the weighed sample and solvent;
    d. agitating the weighed sample and solvent and thereafter extracting a liquid component therefrom; and
    e. analytically analyzing the sample using the solvent based on the weight and a volume of the extracted liquid.

13. The method of claim 12, wherein the sample is weighed in a container.

14. The method of claim 13, wherein the sample is weighed in a weighing boat within the container.

15. The method of claim 12, wherein the analytic analysis is an infrared spectroscopy analysis, and the solvent does not absorb significant electromagnetic radiation at one or more of 3000 nm, 5000 nm, 5700 nm, 6250 nm and 8000 nm.

16. The method of claim 15, wherein the solvent is hexane, heptane, a mixture of octane and carbon tetrachloride, acetone, or acetonitrile.

17. The method of claim 12, wherein analytic analysis is a liquid chromatographic analysis, and the solvent comprises methanol with 5-30% buffered water or another polar solvent or acetonitrile with 5-30% buffered water or another polar solvent.

18. The method of claim 12, wherein a disposable syringe is used to deliver the solvent to the container and to extract the liquid component therefrom.

19. The method of claim 12, wherein the sample is heated in a portable steam generator.

20. The method of claim 12, wherein the solvent comprises no chloroform.

21. The method of claim 12, further comprising determining a target weight of the sample.

22. The method of claim 21, further comprising removing at least a portion of the weighed sample in excess of the determined target weight.

23. The method of claim 12, further comprising computing a weight percent of the extracted liquid based on the weight of the sample and a volume of the solvent.

24. The method of claim 12, wherein the sample contains a lipid component and the solvent for the extracting step and for the analyzing step comprises methanol and a buffer, a concentration of methanol in the solvent used in the extracting step exceeding a concentration of methanol in the solvent used in the analyzing step.

* * * * *